(12) United States Patent
Finger et al.

(10) Patent No.: US 11,821,799 B2
(45) Date of Patent: Nov. 21, 2023

(54) PNEUMATIC TIRE COMPRISING A DEVICE FOR MEASURING A MECHANICAL FORCE AND USE OF THE DEVICE

(71) Applicant: Continental Reifen Deutschland GmbH, Hannover (DE)

(72) Inventors: Sebastian Finger, Hannover (DE); Jorge Lacayo-Pineda, Neustadt (DE); Amit Das, Dresden (DE); Tamil Selvan Natarajan, Dresden (DE)

(73) Assignee: Continental Reifen Deutschland GmbH, Hannover (DE)

(*) Notice: Subject to any disclaimer, the term of this patent is extended or adjusted under 35 U.S.C. 154(b) by 0 days.

(21) Appl. No.: 17/045,218

(22) PCT Filed: Mar. 13, 2019

(86) PCT No.: PCT/EP2019/056207
§ 371 (c)(1),
(2) Date: Oct. 5, 2020

(87) PCT Pub. No.: WO2019/192809
PCT Pub. Date: Oct. 10, 2019

(65) Prior Publication Data
US 2021/0116312 A1    Apr. 22, 2021

(30) Foreign Application Priority Data

Apr. 5, 2018 (IN) .............................. 201841013069
Dec. 5, 2018 (DE) ..................... 10 2018 221 051.9

(51) Int. Cl.
*G01L 1/00* (2006.01)
*B60C 19/00* (2006.01)
*H02J 7/00* (2006.01)

(52) U.S. Cl.
CPC .............. *G01L 1/005* (2013.01); *B60C 19/00* (2013.01); *B60C 2019/004* (2013.01); *H02J 7/00* (2013.01)

(58) Field of Classification Search
CPC .. H01L 41/1132; H01L 41/183; B25J 19/028; G01L 1/14–2293; H02N 1/04
See application file for complete search history.

(56) References Cited

U.S. PATENT DOCUMENTS 4,400,634 A * 8/1983 Micheron ............ H04R 19/013
  307/400
6,469,421 B1 * 10/2002 Wakabayashi ...... H01L 41/0805
  310/328

(Continued)

FOREIGN PATENT DOCUMENTS

CN    1707934 A    12/2005
CN    1753796 A    3/2006

(Continued)

OTHER PUBLICATIONS

DIN EN ISO 4288 1998 (Year: 1998).*

(Continued)

*Primary Examiner* — Tran M. Tran
(74) *Attorney, Agent, or Firm* — Gregory Adams

(57) ABSTRACT

The invention relates to a tire comprising an apparatus, wherein the apparatus comprises a first, second, third, fourth and fifth layer, the third layer being optional, characterized in that: a) the first layer comprises a first electrode material, b) the second layer comprises a first intermediate material, c) the third layer comprises an insulation material, d) the fourth layer comprises a second intermediate material, and e) the fifth layer comprises a second electrode material, wherein the first intermediate material of the second layer and the second intermediate material of the fourth layer are different, the five layers are arranged one above the other (Continued)

according to the above sequence, and the surface of the second or fourth layer layers has a surface roughness $R_a$ in the range from 0.1 µm to 500 µm, measured in accordance with DIN EN ISO 4288:1998. The invention relates to the uses of the apparatus.

17 Claims, 3 Drawing Sheets

(56) References Cited

U.S. PATENT DOCUMENTS

| | | | |
|---|---|---|---|
| 6,992,423 B2 | 1/2006 | Mancosu et al. | |
| 7,781,942 B2* | 8/2010 | Hatano | F03G 7/06 310/339 |
| 8,035,502 B2* | 10/2011 | Heise | B60C 23/0411 340/447 |
| 8,193,926 B2* | 6/2012 | Sinnett | B60C 23/0493 340/443 |
| 8,779,650 B2* | 7/2014 | Jenninger | H01L 41/45 310/328 |
| 8,933,611 B2* | 1/2015 | Nakatsuka | H02N 1/08 310/309 |
| 9,085,198 B2* | 7/2015 | Weston | H01L 41/25 |
| 9,178,446 B2* | 11/2015 | Wang | H02N 1/04 |
| 9,196,820 B2* | 11/2015 | Benwadih | G01L 9/08 |
| 9,233,693 B2* | 1/2016 | Naito | B60W 50/0098 |
| 9,344,011 B2* | 5/2016 | Abou-Nasr | B60C 23/041 |
| 9,595,894 B2* | 3/2017 | Wang | H02N 1/04 |
| 9,685,254 B2 | 6/2017 | Kokubo et al. | |
| 9,786,450 B2* | 10/2017 | Wada | H01L 41/1132 |
| 9,812,993 B2* | 11/2017 | Wang | G01L 9/0072 |
| 9,836,125 B2* | 12/2017 | Lim | G06F 3/0412 |
| 9,837,933 B2* | 12/2017 | Park | H01L 41/113 |
| 9,887,644 B2* | 2/2018 | Kim | H02N 1/04 |
| 9,989,488 B2* | 6/2018 | Borini | H01L 29/772 |
| 10,000,100 B2* | 6/2018 | Weston | B60C 23/0489 |
| 10,013,106 B2* | 7/2018 | Ando | H01L 41/047 |
| 10,014,799 B2* | 7/2018 | Byun | H02N 1/04 |
| 10,199,958 B2* | 2/2019 | Shin | H02N 1/04 |
| 10,211,758 B2* | 2/2019 | He | H02N 1/04 |
| 10,367,431 B2* | 7/2019 | Wang | H02N 1/04 |
| 10,379,617 B2* | 8/2019 | Kho | G06F 3/044 |
| 10,403,794 B2* | 9/2019 | Wang | H01L 33/025 |
| 10,425,018 B2* | 9/2019 | Wang | H02N 1/04 |
| 10,442,091 B2* | 10/2019 | Kondoh | B25J 19/02 |
| 10,461,666 B2* | 10/2019 | Kim | H02N 1/00 |
| 10,498,259 B2* | 12/2019 | Aliane | H02N 1/04 |
| 10,541,628 B2* | 1/2020 | Arizumi | H02N 1/04 |
| 10,587,207 B2* | 3/2020 | Jung | H02N 1/04 |
| 10,587,208 B2* | 3/2020 | Wu | B60C 1/00 |
| 10,630,207 B2* | 4/2020 | Wang | H02N 1/04 |
| 10,636,958 B2* | 4/2020 | Arizumi | H01L 41/113 |
| 10,714,676 B2* | 7/2020 | Otagiri | H02N 1/04 |
| 10,731,635 B2* | 8/2020 | Kyu | F03G 7/005 |
| 10,770,990 B2* | 9/2020 | Byun | H02N 1/04 |
| 10,816,415 B2* | 10/2020 | Choi | G01L 1/18 |
| 10,818,835 B2* | 10/2020 | Sieber | H01L 41/1136 |
| 10,868,479 B2* | 12/2020 | Loi | H02N 1/08 |
| 10,873,275 B2* | 12/2020 | Shin | H02N 1/04 |
| 10,974,553 B2* | 4/2021 | Destraves | B60C 23/0452 |
| 11,010,004 B2* | 5/2021 | Araumi | G06F 3/0446 |
| 11,050,363 B2* | 6/2021 | Hu | C09D 183/04 |
| 11,148,480 B2* | 10/2021 | Ochi | B60C 23/0484 |
| 11,189,778 B2* | 11/2021 | Sugawara | H01L 41/113 |
| 11,189,779 B2* | 11/2021 | Hilgers | H01L 41/09 |
| 2003/0000821 A1* | 1/2003 | Takahashi | H01H 13/785 200/512 |
| 2004/0164558 A1 | 8/2004 | Adamson et al. | |
| 2005/0274176 A1 | 12/2005 | Thiesen et al. | |
| 2012/0177934 A1* | 7/2012 | Vogel | H01L 41/0478 428/457 |
| 2013/0020909 A1* | 1/2013 | Kim | H01L 41/113 977/762 |
| 2013/0057110 A1 | 3/2013 | Aoyagi et al. | |
| 2013/0307370 A1* | 11/2013 | Jenninger | H01L 41/45 310/300 |
| 2013/0307371 A1* | 11/2013 | Sakashita | H01L 41/183 310/300 |
| 2014/0084747 A1* | 3/2014 | Lovera-Prieto | H02N 1/10 310/300 |
| 2014/0300247 A1* | 10/2014 | Takamatsu | C07D 233/00 310/300 |
| 2014/0338458 A1* | 11/2014 | Wang | H02N 1/04 310/309 |
| 2014/0375170 A1 | 12/2014 | Jenninger et al. | |
| 2015/0109006 A1* | 4/2015 | Choi | G01L 1/04 324/691 |
| 2015/0123476 A1 | 5/2015 | Mesia et al. | |
| 2015/0202656 A1* | 7/2015 | Takahashi | H04R 19/005 310/300 |
| 2015/0222204 A1 | 8/2015 | Abou-Nasr et al. | |
| 2016/0159170 A1 | 6/2016 | Kim et al. | |
| 2016/0373028 A1* | 12/2016 | He | H02N 1/04 |
| 2017/0234745 A1 | 8/2017 | Choi | |
| 2017/0359001 A1 | 12/2017 | Wang et al. | |
| 2018/0006582 A1 | 1/2018 | Kim et al. | |
| 2018/0013057 A1 | 1/2018 | Arizumi et al. | |
| 2018/0062543 A1 | 3/2018 | Jung et al. | |
| 2018/0159022 A1* | 6/2018 | Krause | H01L 41/29 |
| 2018/0370301 A1 | 12/2018 | Sekizawa et al. | |
| 2019/0089353 A1 | 3/2019 | Araumi et al. | |
| 2019/0222143 A1 | 7/2019 | Wang et al. | |
| 2019/0296218 A1* | 9/2019 | Ouderkirk | H01L 41/083 |
| 2020/0168788 A1* | 5/2020 | Wang | H01L 41/37 |
| 2020/0244189 A1 | 7/2020 | Polesel-Maris et al. | |
| 2020/0328341 A1 | 10/2020 | Hilgers et al. | |
| 2021/0083600 A1* | 3/2021 | Kim | H02N 1/04 |
| 2021/0155059 A1 | 5/2021 | Lin et al. | |
| 2021/0367134 A1 | 11/2021 | Friis et al. | |

FOREIGN PATENT DOCUMENTS

| | | |
|---|---|---|
| CN | 102684546 A | 9/2012 |
| CN | 102749158 A | 10/2012 |
| CN | 103107737 A | 5/2013 |
| CN | 103368447 A | 10/2013 |
| CN | 103411710 A | 11/2013 |
| CN | 203410251 U | 1/2014 |
| CN | 103684035 A | 3/2014 |
| CN | 103828082 A | 5/2014 |
| CN | 103856096 A | 6/2014 |
| CN | 104245558 A | 12/2014 |
| CN | 203984306 U | 12/2014 |
| CN | 104786754 A | 7/2015 |
| CN | 204731033 U | 10/2015 |
| CN | 105099259 A | 11/2015 |
| CN | 105991063 A | 10/2016 |
| CN | 205951381 | 2/2017 |
| CN | 106602922 A | 4/2017 |
| CN | 106610324 A | 5/2017 |
| CN | 106653156 A | 5/2017 |
| CN | 106961228 A | 7/2017 |
| CN | 107430937 A | 12/2017 |
| CN | 107547003 A | 1/2018 |
| CN | 107769607 A | 3/2018 |
| DE | 102014215763 A1 | 2/2016 |
| DE | 102015221694 A1 | 5/2017 |
| JP | 2006521233 A | 9/2006 |
| JP | 2013055724 A | 3/2013 |
| JP | 2014217130 A | 11/2014 |
| JP | 2016139779 A | 8/2016 |
| JP | 2017183814 A | 10/2017 |
| KR | 101549445 B1 | 9/2015 |
| WO | 2017110398 A1 | 6/2017 |
| WO | 2017159023 A1 | 9/2017 |

(56) References Cited

FOREIGN PATENT DOCUMENTS

| WO | 2017211914 A2 | 12/2017 |
| WO | 2019077077 A1 | 4/2019 |

OTHER PUBLICATIONS

Gomes et al., "Influence of Thickness and Contact Area of the Performance of PDMS-based Triboelectric Nanogenerators", Mar. 27, 2018 (Year: 2018).*
Triboelectric Nanogenerator Boosts Smart Green Tires, 2018—Wiley VCH Verlag.
International Search Report of International Application PCT/EP2019/056209 on which this application is based.
Tulin Zhang, Ya Yang, Xiandai Zhong, Yuanjie Su, Yushen / Single-Electrode-Based Rotating Triboelectric Nanogenerator for Harvesting Energy from Tires / Dec. 4, 2013.
Feng-Ru Fan, Long Lin, Guang Zhu, Wenzhuo Wu, Rui Zha, and Zhong / Transparent Triboelectric Nanogenerators and Self-Powered Pressure Sensors Based on Micropatterned Plastic Films.
Xiaohu Ren, Huiqing Fan, Jiangwei Ma, Chao Wang, Yuwei Zhao, and / A Triboelectric Nanogenerators Based on Fluorinated Wasted Rubber Powder for Self-powering Application / Jan. 7, 2017.
"K.Y.Lee, et al. / Transparent flexible stretchable piezoelectric and triboelectric nanogenerators for poweringportable electronics / Nov. 1, 2014".
Yanchao Mao, Dalong Geng, Erjun Liang, Xudong Wang / Single-electrodetriboelectric nanogenerator for scavenging friction energy from rolling tires / Apr. 16, 2015.
Feng-Ru Fan, Zhong-Qun Tian, Zhong Lin Wang / Flexible triboelectric generator! / Jan. 10, 2012.

* cited by examiner

PNEUMATIC TIRE COMPRISING A DEVICE FOR MEASURING A MECHANICAL FORCE AND USE OF THE DEVICE

The invention relates to a tire comprising an apparatus, wherein the apparatus comprises a first, second, third, fourth and fifth layer, the third layer being optional. The invention relates to the uses of the apparatus.

Sensors are playing an ever greater role in today's automobile industry. They can not only help to monitor the material properties in the production or in the use of various automotive parts, but also make it possible to perceive effects of forces that would be perceptible only with difficulty, if at all, without them. It is often necessary here to mount the sensors at various points in the automobile in order to measure the changes in the material properties or acting forces directly in situ. The size of the sensors can also play a role here, and this should be at a minimum, in order that the mounting of the sensor does not entail any additional problems.

In addition, sensors can frequently be used only with the aid of a power source. The connection to the power source and the mounting of the power source at a suitable point additionally make it more difficult to install a sensor at an envisaged site.

One problem underlying the invention is that of providing an apparatus that enables measurement of mechanical forces in a tire during travel, for example lateral forces or braking forces. In particular, this should preferably be possible without the use of an additional electrical power source, and the apparatus should be particularly sensitive. In addition, another object of the invention was to provide an apparatus for charging an energy source in a tire or a wheel.

In general, this object is achieved according to the invention by an apparatus, characterized in that the apparatus comprises the following layers
 a first layer comprising a first electrode material,
 a further layer comprising a first intermediate material,
 a further layer comprising a second intermediate material,
and
 a further comprising a second electrode material,
wherein
 the apparatus,
  the first intermediate material and the second intermediate material are different. Preferably, the apparatus comprises means for measuring the voltage between the first and fifth layers comprising a second electrode material, or between the layer comprising a first intermediate material and the layer comprising a second intermediate material.

In the context of the present invention, the phrase "the four [...] layers are arranged one above the other according to the above sequence" means that the first layer is mounted directly on the second layer, the second layer directly on the fourth layer and the fourth layer directly on the fifth layer, with no further layers present between these four. This applies in particular to the four specific embodiments of the present invention described below.

In the context of the present invention, the term "fifth layer" is to be understood merely as a nomenclature of this layer and is not to be understood in such a way that there must be four additional layers present in addition to this fifth layer. The same applies to the second, third and fourth layers. Thus, for example, in an apparatus according to the invention, four layers can be present, wherein the four layers consist of a first, second, fourth and fifth layer. In this sense, within the context of the entire present invention, the first layer can also be designated as the top layer, the second layer as the upper middle layer, the third layer as the insulation layer, the fourth layer as the lower middle layer and the fifth layer as the bottom layer. This applies in particular to the four specific embodiments of the present invention described below.

All advantages of the above general solution of the object are described below by specific embodiments and apply mutatis mutandis to the above general embodiment.

In a first embodiment this object is in particular according to the invention by an apparatus for measuring a mechanical force, comprising a first, second, third, fourth and fifth layer, the third layer being optional, characterized in that
 a) the first layer comprises a first electrode material,
 b) the second layer comprises a first intermediate material,
 c) the third layer comprises an insulation material,
 d) the fourth layer comprises a second intermediate material,
and
 e) the fifth layer comprises a second electrode material,
wherein
  the first intermediate material of the second layer and the second intermediate material of the fourth layer are different,
  the four or five layers are arranged one above the other according to the above sequence,
  the surface of the second or fourth layer has a surface roughness $R_a$ in the range from 0.1 µm to 500 µm, measured in accordance with DIN EN ISO 4288:1998.

It has been found that, surprisingly, in the context of the present invention, in the event of friction between two different intermediate materials having the above-described dielectric conductivities in the second and fourth layers, sufficient electrons per unit area must be transferred for a sufficiently high voltage to arise on separation of these two intermediate materials rubbed against one another. The resultant voltage can then be exploited in order to generate an electrical signal. This electrical signal can be utilized in order to measure or even quantify the force that generates the original friction. In the context of the present invention, the second and fourth layers of an apparatus according to the invention comprise the respective intermediate materials which can be charged by contact and especially by friction. The presence of the first and second intermediate layers, i.e. the second and fourth layers of an apparatus according to the invention, causes higher voltages and current flows, and thus also higher powers to be achieved during current generation, or a more sensitive measuring apparatus during measurement, than with comparable apparatuses that are not according to the invention, in which only one intermediate layer is present between the two electrode materials.

Preference is given to an apparatus as described above, wherein the apparatus
 is suitable for measuring a mechanical force
and/or
 is suitable for generating an electrical voltage and for electrically charging a battery and/or accumulator attached to a wheel comprising the tire or attached to the tire, which is preferably a tire in accordance with the invention described below.

In addition, within the context of the present invention a third layer can be optionally present between the second and fourth layers, designed such that the second and fourth layers of an apparatus according to the invention can be separated from one another in a first state and come into contact with one another in a second state. The second state of an apparatus according to the invention may be triggered here by a force which acts at right angles to the layers and which causes contact between the second and fourth layers of an apparatus according to the invention. A crucial contribution made by the present invention is therefore that of having recognized that in the presence of the third layer between the second and fourth layers of an apparatus according to the invention as described above or as described above as preferred, more electrons can be transferred between the second and fourth layers in order to generate an electrical voltage between the second and fourth layers after separation of the contact between them. Subsequently, the electrons transferred in the second state can be kept separate by means of transition to a third state of the apparatus according to the invention. The transferred electrons lead to a difference in charge between the second and fourth layers and hence consequently also between the first and fifth layers of the apparatus according to the invention. The difference in voltage between the first and fifth layers is induced by the electrons transferred, while the fourth and second layers are removed from one another again after contact. The presence of a third layer can increase the voltage difference.

It has been possible to show that by roughening the surface, which faces the third layer, of the second and/or fourth layer, it was possible to further increase the voltage or electrical power generated in an apparatus according to the invention, and thus to achieve an even more sensitive measurement of forces on the apparatus according to the invention.

The voltage between the first and fifth layers of the apparatus according to the invention can be measured by means of a voltmeter. The apparatus according to the invention therefore preferably also has a voltmeter for measuring the voltage between the second and fourth layers or between the first and fifth layers of the apparatus according to the invention.

However, preference is given to an apparatus as described above or as described above as preferred, an apparatus for measuring a mechanical force, comprising a top layer, an upper middle layer, a lower middle layer and lower middle layer and no third layer, characterized in that
the top layer comprises a first electrode material,
the upper middle layer comprises a first intermediate material,
the lower middle layer comprises a second intermediate material,
and
the bottom layer comprises a second electrode material,
wherein
the first intermediate material of the upper middle layer and the second intermediate material of the lower middle layer are different,
the four layers are arranged one above the other according to the above sequence,
and
the upper middle layer and/or the lower middle layer comprises at least one filler in addition to the second intermediate material.

Such an apparatus has in particular the advantages described below if it is fitted in a tire according to the invention as described below.

Preference is given to an apparatus as described above or as described as preferred above, wherein the surface of the second and/or fourth layer has a surface roughness $R_a$ in the range from 0.5 to 100 µm, preferably 1 to 50 µm, particularly preferably 1 to 5 µm, measured in accordance with DIN EN ISO 4288:1998.

Preference is given to an apparatus as described above or as described as preferred above, characterized in that for measuring a mechanical force, comprising a first, second, third, fourth and fifth layer, characterized in that
  a) the first layer comprises a first electrode material,
  b) the second layer comprises a first intermediate material having a dielectric conductivity $e_r$ of greater than 1.01 $F \cdot m^{-1}$,
  c) the third layer comprises an insulation material,
  d) the fourth layer comprises a second intermediate material having a dielectric conductivity $e_r$ of greater than 1.01 $F \cdot m^{-1}$,
and
  e) the fifth layer comprises a second electrode material,
wherein
  the first intermediate material of the second layer and the second intermediate material of the fourth layer are different,
  the five layers are arranged one above the other,
  the second and fourth layers are separated from one another by means of the third layer in a first state of the apparatus
and
  the third layer is designed such that the second and fourth layers can come into contact with one another in a second state of the apparatus.

Preference is given to an apparatus as described above or as described as preferred above, characterized in that
  a) the first layer consists of a first electrode material,
  b) the second layer comprises a first intermediate material having a dielectric conductivity $e_r$ of greater than 1.01 $F \cdot m^{-1}$,
  c) the third layer comprises an insulation material,
  d) the fourth layer comprises a second intermediate material having a dielectric conductivity $e_r$ of greater than 1.01 $F \cdot m^{-1}$,
and
  e) the fifth layer consists of a second electrode material,
wherein
  the first intermediate material of the second layer and the second intermediate material of the fourth layer are different,
  the five layers are arranged one above the other,
  the second and fourth layers are separated from one another by means of the third layer in a first state of the apparatus
and
  the third layer is designed such that the second and fourth layers can come into contact with one another in a second state of the apparatus.

Special preference is given to an apparatus as described above or as described above as preferred, characterized in that
  a) the first layer consists of a first electrode material,
  b) the second layer consists of a first intermediate material having a dielectric conductivity $e_r$ of greater than 1.01 $F \cdot m^{-1}$,
  c) the third layer comprises an insulation material,
  d) the fourth layer consists of a second intermediate material having a dielectric conductivity $e_r$ of greater than 1.01 $F \cdot m^{-1}$,
and
  e) the fifth layer consists of a second electrode material,
wherein
  the first intermediate material of the second layer and the second intermediate material of the fourth layer are different,
  the five layers are arranged one on top of another,
  the second and fourth layers are separated from one another by means of the third layer in a first state of the apparatus
and the third layer is designed such that the second and fourth layers can come into contact with one another in a second state of the apparatus.

It is preferable in the context of the present invention that the transition of the apparatus from the first state to the second state is triggered by means of the action of a mechanical force on the apparatus according to the invention. It is more preferable, in addition, when the apparatus according to the invention in the second state is then converted to a third state as soon as the above-described mechanical force ceases to act on the apparatus according to the invention. The third state of the apparatus according to the invention differs from the first state of the apparatus according to the invention in that an electrical voltage can be measured between the second and fourth layers or between the first and fifth layers of the apparatus according to the invention.

In the context of the present invention, the expression "mechanical force" preferably encompasses any external action on an apparatus according to the invention that has the effect of converting the apparatus according to the invention from the first state to the second state. The above-described mechanical force should preferably act at right angles to the longitudinal extent of the five layers of the apparatus according to the invention.

Preference is given to an apparatus according to the invention as described above or as described above as preferred when the five layers lie one on top of another in the sequence specified above by the letters a), b), c), d) and e) and there are no further layers present between them.

It is more preferable when the apparatus according to the invention comprises a transmission unit which converts the voltage generated between the first and fifth layers of the apparatus according to the invention to an electromagnetic signal which can then be received by a receiving unit elsewhere in a space-saving manner. It is advantageous here when the signal contains information relating to the magnitude of the voltage, in order to be able to quantify the voltage and thus the mechanical force exerted.

In the context of the present invention, it is possible to use any material known in the prior art which is used in an electrode in the prior art for the first and second electrode materials of the apparatus according to the invention. Preferably, both electrode materials consist of the same material, especially the same metal. In the context of the present invention, preferred electrode materials are selected from the group consisting of: copper, aluminum, silver, iron oxide and carbon-based materials.

Particularly preferably, electrode materials are selected from the group consisting of: copper, aluminum, silver and carbon-based materials.

Particularly preferably, electrode materials are selected from the group consisting of: copper, aluminum, carbon fiber and rubber compounds with a specific conductivity at 20° C. of more than 1 S·cm$^{-1}$. Such rubber compounds are, in particular, rubber compounds with a carbon black content of more than 20 phr carbon black, particularly preferably more than 50 phr carbon black, very particularly preferably more than 80 phr carbon black.

In the context of the present invention, carbon-based materials are preferably graphite, graphene, carbon nanotubes, carbon black. The first and fifth layers do not have to have the same dimensions as the second and fourth layers and, in particular, can be smaller. It is also conceivable that the first and fifth layers are structured in a tissue-like manner and thus do not form continuous layers. It is also possible for the first and fifth layers to consist of one or more wires and/or fibers separated from one another. The function of the electrode material of the first and fifth layers of an apparatus according to the invention is primarily to guarantee the fast transport of electrons and can therefore be arbitrarily designed as long as this function is fulfilled.

In the context of the present invention, the first or second intermediate materials used may be any materials having a dielectric conductivity $e_r$ of greater than 1.01 F·m$^{-1}$. In the context of the present invention, the intermediate material merely has the task of absorbing electrons from the respective other intermediate material and releasing them, and hence of generating a charge of correspondingly opposite polarity in the respective adjoining electrode material. The charge of opposite polarity generated in the electrode material generates a voltage between the first and fifth layers of the apparatus according to the invention. In the context of the present invention, it has been found that, surprisingly, intermediate materials having a dielectric conductivity $e_r$ of greater than 1.01 F·m$^{-1}$ are sufficient to generate a sufficiently great voltage which can be utilized for measurement of the mechanical force.

It is additionally advantageous here when the insulation material of the third layer of an apparatus according to the invention preferably has a lower conductivity at 20° C. than the conductivity of the first intermediate material and the second intermediate material. A lower conductivity of the insulation material than the first and second intermediate materials would already be sufficient to at least briefly generate a voltage between the second and fourth layers or the first and fifth layers which can be utilized for generation of an electrical signal.

Particularly high mechanical forces can also generate particularly high voltages in the apparatus according to the invention, which can be utilized not just for measuring the mechanical force but also for charging a power storage means or for driving an electrically operated apparatus.

Preference is given to an apparatus as described above or as described above as preferred, the apparatus comprising a third layer and the second and fourth layers in a first state of the apparatus being separated by means of the third layer, the third layer being designed such that the second and fourth layers can come into contact with one another in a second state of the apparatus.

As described above, it is advantageous to have a third layer in an apparatus according to the invention, which ensures that the second and fourth layers are completely separated from one another, all the more so to achieve a maximum electrical power, i.e. the product of measured voltage to the current flow, of the apparatus according to the invention. However, it is also possible to achieve a current flow and thus a voltage between the second and fourth layers of the apparatus according to the invention, and thus also between the first and fifth layers, without the second and fourth layers completely separating from one another. In an apparatus according to the invention, a voltage and a current flow can also be generated if the fourth and second layers are permanently touching one another and only the force acting on them is varied. Such a preferred embodiment of the present invention is particularly advantageous for use in a vehicle tire, where a third layer as described above or below is difficult to implement. For the above reasons, a third layer is only optimal for an apparatus according to the invention.

Preference is given to an apparatus as described above or as described above as preferred, wherein the apparatus
   additionally comprises means of measuring the voltage
      between the first and fifth layers of the apparatus
   and/or comprises a transmitter unit suitable for generating an electromagnetic signal from the voltage between the first and fifth layers of the apparatus, and/or additionally enables means of contacting the first and second electrode materials with the means of measuring the voltage or with the transmitter unit.

It is preferable that the apparatus according to the invention comprises means of converting the electrical voltage generated to an RF signal, in which case the height of the voltage can also be read off from the RF signal. This means that the open-loop and/or closed-loop control unit that evaluates the signal need not be mounted in the same place as the apparatus according to the invention.

In the context of the present invention, the values of electrical conductivity, unless stated otherwise, are always based on values which have been measured under standard conditions, i.e. in particular at 20° C. and atmospheric pressure. Electrical conductivity can be carried out, for example, by standard ASTM E1004-17

Preference is given to an apparatus as described above or as described above as preferred, wherein the second and/or fourth layer comprises at least one filler in addition to the second intermediate material, wherein the at least one filler preferably of the second layer is carbon black and/or silica and/or of the fourth layer is carbon black and/or silica.

Preference is given to an apparatus as described above or as described above as preferred, wherein the total amount of the at least one filler in the case of silica preferably is in a range from 0.1% by weight to 50% by weight, preferably in the range from 5% by weight to 25% by weight, particularly preferably in the range from 10% by weight to 20% by weight, very particularly preferably in the range from 13% by weight to 17% by weight, in each case as a proportion of the total mass of the second and/or fourth layer of the apparatus. Such an apparatus generates an even greater electrical power.

Preference is given to an apparatus as described above or as described above as preferred, wherein the total amount of the at least one filler in the second and/or fourth layer is preferably in the range from 0.1% by weight to 50% by weight, preferably in the range from 1% by weight to 20% by weight, particularly preferably in the range from 1% by weight to 10% by weight, very particularly preferably in the range from 3% by weight to 7% by weight, in each case as a proportion of the total mass of the second and/or fourth layer of the apparatus.

Such an apparatus generates an even greater electrical power.

Preference is given to an apparatus as described above or as described above as preferred, wherein the third layer comprises an insulation material which at 20° C. has an electrical conductivity of less than $10^{-1}$ S·cm$^{-1}$, preferably of less than $10^{-3}$ S·cm$^{-1}$, particularly preferably less than $10^{-6}$ S·cm$^{-1}$.

One advantage of the above-described aspect of the present invention is that the above-described insulation materials, by virtue of their low electrical conductivity, keep the electrons that have been transferred in the second state of the apparatus according to the invention separate for a particularly long period.

Preference is given to an apparatus as described above or as described above as preferred, wherein each of the five layers has a transverse extent and two longitudinal faces, wherein the total area of one longitudinal face of the second layer is in contact with the area of one longitudinal face of the first layer and/or the total area of one longitudinal face of the fourth layer is in contact with the area of one longitudinal face of the fifth layer.

One advantage of the above-described aspect of the present invention is that particularly area-covering contact between the layers enables faster induction of voltage between the first and fifth layers of the electrons between the respective layers.

In the context of the present invention, it is preferable when the transverse extent of a layer according to an apparatus of the invention runs parallel to the shortest extent of the layer and hence at right angles to the longitudinal faces of the layers of an apparatus according to the invention. It is particularly preferable when the longitudinal faces of the layers of an apparatus of the invention are the faces of the layers of the apparatus according to the invention that each adjoin the adjacent layer of the apparatus according to the invention. This applies both to all the above apparatuses according to the invention and to all of those described hereinafter.

Preference is given to an apparatus as described above or as described above as preferred, wherein each of the five layers has a transverse extent and two longitudinal faces, wherein, in the first state of the apparatus, the total area of the first longitudinal face of the third layer is in contact with the entire area of one longitudinal face of the second layer and/or the total area of the second longitudinal face of the third layer is in contact with the entire area of one longitudinal face of the fourth layer and wherein in the second state of the apparatus according to the invention, at least 50% of the total surface area of the said longitudinal face of the second layer, preferably at least 80%, are in contact with the surface of the said longitudinal face of the fourth layer and at least 50% of the total surface area of the said longitudinal face of the fourth layer, preferably at least 80%, are in contact with the surface of the said longitudinal face of the second layer.

One advantage of the above-described aspect of the present invention is that, in the second state of the apparatus according to the invention, a particularly large number of electrons per unit longitudinal area can be transferred between the second and fourth layers.

Preference is given to an apparatus as described above or as described above as preferred, wherein the first intermediate material of the second layer has a dielectric conductivity $\varepsilon_r$ of greater than 1.1 F·m$^{-1}$, preferably greater than 1.5 F·m$^{-1}$, preferably greater than 2 F·m$^{-1}$, more preferably greater than 5 F·m$^{-1}$, most preferably greater than 10 F·m$^{-1}$, and/or the second intermediate material of the fourth layer has a dielectric conductivity $e_r$ of greater than 1.1 F·m$^{-1}$, preferably greater than 1.5 F·m$^{-1}$, preferably greater than 2 F·m$^{-1}$, more preferably greater than 5 F·m$^{-1}$, most preferably greater than 10 F·m$^{-1}$.

One advantage of the above-described aspect of the present invention is that the above-described first and second intermediate materials can absorb a particularly large number of electrons and hence can generate particularly high voltage differences between the first and fifth layers of an apparatus according to the invention. This enables measurement of particularly small mechanical forces with an apparatus according to the invention.

More preferably, the dielectric conductivity $e_r$ of one of the above-described first or second intermediate materials is not greater than 100 F·m$^{-1}$, most preferably not greater than 50 F·m$^{-1}$.

In the context of the present invention, the dielectric conductivity $e_r$ of an intermediate material is also called relative permittivity $e_r$ and is measured at 20° C. and a frequency of 50 Hz. The measurement can be carried out, for example, using a commercially available RLC measuring instrument according to a method known to the person skilled in the art.

The determination of the dielectric conductivity $e_r$ is preferably carried out as follows using a commercially available RLC measuring instrument:

the loss factor Tan δ is indicated directly as the "DF: dissipation factor", while it must be calculated using the measurement results of the plate capacitor filled with dielectric material, or while it must preferably be calculated using the measurement results of an apparatus according to the invention.

When measuring the capacitance, it must be taken into account that, in addition to the capacitance of the electrodes that is sought, the capacitance of the supply line and the sample capacitor housing at the input of the bridge of the plate capacitor is also included. The resulting stray capacitance $C_F$ is independent of the frequency and must be taken into account in the evaluation, i.e. subtracted.

Preference is given to an apparatus as described above or as described above as preferred, wherein the difference between the specific triboelectric affinity of the first intermediate material of the second layer and the specific triboelectric affinity of the second intermediate material of the fourth layer is at least 20 nC/J, preferably at least 40 nC/J, more preferably at least 60 nC/J, measured at 20° C. and at 35% relative air humidity.

One advantage of the above-described aspect of the present invention is that the first and second intermediate materials have not just sufficiently high permittivity as described above, but also have a sufficiently great difference in relation to the specific triboelectric affinity and hence can transfer a particularly large number of electrons on contact of the second layer with the fourth layer of the apparatus according to the invention in the second state.

In the context of the present invention, it has been found that those forces in the tire that act in the radial direction can be measured sufficiently well with a difference of 20 nC/J.

In the context of the present invention, it has likewise been found that those forces in the tire that act in the circumferential direction direction can be measured sufficiently well with a difference of 40 nC/J.

In the context of the present invention, it has likewise been found that lateral forces in the tire can be measured sufficiently well with a difference of 60 nC/J.

The measurement of the specific triboelectric affinity of an intermediate material, in the context of the above invention, was conducted at atmospheric pressure and 22° C. A sample consisting of an intermediate material with an area of 1 cm×1 cm, called intermediate material sample hereinafter, and a reference sample of acrylonitrile-butadiene rubber with an area of 1 cm×2 cm were provided. The reference sample was secured over its full area to a copper contact having an identical area of 1 cm×2 cm. The intermediate material sample and the reference sample were electrostatically neutralized with a "7006 AC GEN4 Ionizing Bar" from Exair. Subsequently, the intermediate material samples were superposed over the full area on one end of the reference sample with an area of 1 cm×2 cm. Subsequently, the sample materials were pressed together edge to edge with a force of 0.1 N over the superposed area of 1 cm$^2$ and, during the application of this force, the intermediate material sample was pulled from one end of the reference sample to the other end of the reference sample, such that it covered a distance of 1 cm. After adequate separation of the intermediate material sample and the reference sample and mounting of the intermediate material sample on an appropriate copper contact having an identical area of 1 cm×1 cm, the resultant voltage between the intermediate material sample and the reference was ascertained by means of an AlphaLab Surface DC Voltmeter SVM2 from "AlphaLab Inc." The reciprocal of the voltage value thus obtained between the two contacts gives the above-described specific triboelectric affinity of the intermediate material examined.

The specific triboelectric affinity of the first and second intermediate materials should preferably not exceed 150 nC/J, and should more preferably not exceed 100 nC/J.

Preference is given to an apparatus as described above or as described above as preferred, wherein the third layer comprises a support border consisting of a vulcanized natural or synthetic rubber or a thermoset, and a mixture is present in the support border, the mixture comprising one or more gases and/or particles consisting of an insulation material, wherein the support border preferably has a thickness of 0 to 200 μm and/or a maximum electrical conductivity of 10 μS/m.

Preference is given to an apparatus as described above or as described above as preferred, wherein the third layer
  consists of a mixture, wherein the mixture comprises a gas
    and particles consisting of the insulation material or
    consists of a gas and particles consisting of the insulation material, wherein the insulation material is preferably selected from the group consisting of wool, a resin, amber, wood, paper and polycarbonate.

Preferred gases are air, nitrogen or argon, but especially air. The particles may be in round form, in cord-like form or another form. They are preferably in cord-like form as in the case of wool with a longitudinal extent of 1 mm to 10 cm and a thickness of not more than 1 mm.

Preference is given to an apparatus as described above or as described above as preferred, wherein the third layer includes or consists of, as insulation material, a liquid having a viscosity at 20° C. in the range from 0.1 mPa·s to 10$^6$ mPa·s, preferably having a viscosity at 20° C. in the range from 1 mPa·s to 10,000 mPa·s, more preferably having a viscosity at 20° C. in the range from 1 mPa·s to 100 mPa·s. More preferably, the third layer consists of the above-described liquid.

One advantage of the above-described aspect of the present invention is that liquids having the above-described viscosities and especially having the conductivities of the third layer that are described further up are of particularly good suitability as a third layer in an apparatus according to the invention. In this context, however, the third layer should be laterally delimited by a further material such that the above-described liquid remains in situ. This further material should be nonconductive with the conductivities described further up, since it would connect both the second and the fourth layer so as to impose boundaries on the above-described liquid.

Preference is given to an apparatus as described above or as described above as preferred, wherein the third layer comprises, as insulation material, a compound having a compression modulus in the range from 1 to 30 GPa, preferably having a compression modulus in the range from 5 to 10 GPa.

One advantage of the above-described aspect of the present invention is that compounds having the above-described compression moduli and especially having the conductivities of the third layer that are described further up are of particularly good suitability as a third layer in an apparatus according to the invention. In particular for use in a tire or industrial rubber articles such as conveyor belts, hoses and drive belts, but most particularly for tires.

Preference is given to an apparatus as described above or as described above as preferred, wherein the first intermediate material of the second layer comprises a solid material or consists primarily of a solid material selected from the group consisting of polyurethane, aluminum, polyamide, a mica, glass, polyacrylates, quartz, lead, silk, cellulose and mixtures thereof. The first intermediate material particularly preferably comprises or consists primarily of a solid material selected from the group consisting of polyurethane, polyamide, a mica, glass, polyacrylate, quartz, silk, poly(organo)siloxanes, cellulose and mixtures thereof.

Preference is also given to an apparatus as described above or as described above as especially preferred, wherein the first intermediate material of the second layer is nylon or aluminum. But glass and cellulose are also preferred, as they advantageously have a dielectric conductivity exceeding 2 $F \cdot m^{-1}$.

Preference is given to an apparatus as described above or as described above as especially preferred, wherein the second intermediate material of the fourth layer comprises a solid material or consists primarily of a solid material selected from the group consisting of natural or synthetic rubber, polyester, polyethylene, polyethylene terephthalates, polypropylene, polystyrene, polychlorobutadiene, polyacrylonitrile, polyvinyl chloride, poly(organo)siloxanes, Teflon, polyimides, vulcanized rubber particles, fillers and mixtures thereof. Particularly preferably, the second intermediate material of the fourth layer comprises or consists primarily of a solid material selected from the group consisting of acetate silk, natural or synthetic rubber, epichlorohydrin rubber, polyester, polyethylene, polyethylene terephthalates, polypropylene, polystyrene, polychlorobutadiene, polyacrylonitrile, polyvinyl chloride, Teflon, polyimides, vulcanized rubber particles, fillers and their mixtures, wherein the natural or synthetic rubbers are preferably the rubbers BR, SBR, SSBR, PDMS, ISBR and epichlorohydrin rubber.

Within the scope of the present invention, the term "epichlorohydrin rubber" covers all polymers comprising epichlorohydrin as a monomer unit, in particular polymerized epichlorohydrin, block copolymer partly made from epichlorohydrin and terpolymers partly made from epichlorohydrin, in particular the terpolymer made from epichlorohydrin, epoxy ether (i.e. ethylene oxide) and allyl-glycidyl ether, under the name GECO.

Preference is also given to an apparatus as described above or as described above as especially preferred, wherein the second intermediate material of the fourth layer comprises natural or synthetic rubber, poly(organo)siloxanes, vulcanized rubber particles with surface-modified fluorohydrocarbon chains and mixtures thereof, wherein each of the second intermediate materials mentioned more preferably additionally comprises graphite, silica or carbon black. Particular preference is given to an apparatus as described above or as described above as especially preferred, wherein as second intermediate material of the fourth layer use is made of polyisoprene, poly(dimethyl)siloxanes, vulcanized rubber particles with surface-modified fluorohydrocarbon chains and mixtures thereof, wherein each of the second intermediate materials mentioned very especially preferably additionally comprises graphite. But preference is also given to natural or synthetic rubber, polyethylene, polypropylene, polyvinyl chloride or Teflon as a second intermediate material of the fourth layer, since they advantageously have a dielectric conductivity exceeding 2 $F \cdot m^{-1}$, wherein the natural or synthetic rubbers are preferably the rubbers BR, SBR, SSBR, PDMS, ISBR and epichlorohydrin rubber.

Preference is given to an apparatus as described above or as described above as preferred, wherein the apparatus additionally comprises a stabilization shell for increasing the mechanical stability of the apparatus, which surrounds the entirety of the five layers.

One advantage of the above-described aspect of the present invention is that the stabilization shell keeps the layers in their places and imparts mechanical stability to the apparatus. It can also extend partly as far as between the fourth and second layers of an apparatus according to the invention, in order to help in the expansion of the third layer after the application of the mechanical force.

The stabilization shell may consist primarily or entirely of one of the following compounds: a resin, amber, wood, paper, polycarbonate, polyurethane, polyamide, polyacrylates, natural or synthetic rubber, polyester, polyethylene, polyethylene terephthalates, polypropylene, polystyrene, polychlorobutadiene, polyacrylonitrile, polyvinyl chloride, poly(organo)siloxanes, Teflon, polyimides, vulcanized rubber particles, fillers and mixtures thereof. Preferably, however, the stabilization shell consists of a resin, amber, wood, paper or polycarbonate.

Preference is given to an apparatus as described above or as described above as preferred, wherein
the second intermediate material of the fourth layer
comprises epichlorohydrin rubber or
consists primarily or entirely of epichlorohydrin rubber
and/or
the first intermediate material of the second layer
comprises poly(organo)siloxanes, preferably PDMS, or
consists primarily or entirely of poly(organo)siloxane, preferably PDMS.

Such an apparatus according to the invention has a higher electrical power.

Preference is given to an apparatus as described above or as described above as preferred, wherein the surface of the second and/or fourth layer has a surface roughness $R_a$ in the range from 0.1 µm to 500 µm, preferably in the range from 0.5 to 100 µm, particularly preferably in the range from 1 to 50 µm, very particularly preferably in the range from 1 to 5 µm, measured according to DIN EN ISO 4288:1998. The said surface of the second and/or fourth layer in the context of the present invention is always the surface of the second and/or fourth layer facing the third layer. Such an apparatus according to the invention has a higher electrical power.

Preference is given to an apparatus as described above or as described above as preferred, wherein the second and/or fourth layer have a layer thickness, in the following also called the transverse extent of the one layer, in the range in the range from 10 to 1000 µm, preferably in the range from 30 to 300 µm, particularly preferably in the range from 70 to 160 µm or from 101 to 160 µm, very particularly preferably in the range from 110 to 130 µm.

Such an apparatus according to the invention has a higher electrical power.

Preference is given to an apparatus as described above or as described above as preferred, wherein each of the five layers has a longitudinal extent at right angles to the transverse extent and
the longitudinal extent of every single one of the five layers is in the range from 0.1 to 1000 mm, preferably in the range from 0.1 to 100 mm, more preferably in the range from 0.1 to 10 mm,
and/or
the transverse extent of every single one of the five layers is in the range from 0.01 to 10 mm, preferably in the range from 0.01 to 1 mm, more preferably in the range from 0.01 to 0.1 mm.

One advantage of the above-described aspect of the present invention is that the above dimensions are of particularly good suitability for measuring a mechanical force in tires or industrial rubber articles such as conveyor belts, hoses and drive belts, but most particularly for tires.

A particularly high degree of preference is given to an apparatus as described above, characterized in that
a) the first layer consists of a first electrode material,
b) the second layer consists of a first intermediate material,
c) the third layer comprises an insulation material,  d) the fourth layer consists of a second intermediate material,
and
e) the fifth layer consists of a second electrode material, wherein
the first intermediate material of the second layer and the second intermediate material of the fourth layer are different,
the five layers are arranged one above the other,
the second and fourth layers are separated from one another by means of the third layer in a first state of the apparatus,
the third layer is designed such that the second and fourth layers can come into contact with one another in a second state of the apparatus,
the insulation material of the third layer at 20° C. has an electrical conductivity of less than $10^{-3}$ S·cm$^{-1}$,
each of the five layers has a transverse extent and two longitudinal faces, wherein the entire area of one longitudinal face of the second layer is in contact with the area of one longitudinal face of the first layer and the entire area of one longitudinal face of the fourth layer is in contact with the area of one longitudinal face of the fifth layer,
in the first state of the apparatus, the entire area of the first longitudinal face of the third layer is in contact with the area of one longitudinal face of the second layer and the entire area of the second longitudinal face of the third layer is in contact with the area of one longitudinal face of the fourth layer,
the third layer, as insulation material, a liquid having a viscosity at 20° C. in the range from 1 mPa·s to 100 mPa·s,
the first intermediate material of the second layer consists of nylon or aluminum,
the second intermediate material of the fourth layer consists of a mixture of solid polydimethylsiloxane and solid particles of graphite
and
each of the five layers has a longitudinal extent at right angles to the transverse extent and the longitudinal extent of every single one of the five layers is in the range from 0.1 to 100 mm and the transverse extent of every single one of the five layers is in the range from 0.01 to 1 mm.

The above-described advantageous aspects of an apparatus according to the invention for measuring a mechanical force are also applicable to all aspects of a tire or industrial rubber article described hereinafter, and the advantageous aspects of tires or industrial rubber articles according to the invention that are discussed hereinafter are correspondingly applicable to all aspects of an apparatus according to the invention for measuring a mechanical force.

The invention also relates to a tire or an industrial rubber article comprising an apparatus as described above or as described above as preferred, and optionally, means of measuring the voltage between the first and fifth layers of the apparatus or between the second and fourth layers of the apparatus.

Industrial rubber articles are preferably conveyor belts, hoses and drive belts.

Preferably, a tire according to the invention is a pneumatic tire, more preferably a pneumatic vehicle tire, most preferably a pneumatic vehicle tire for utility vehicles or cars, very especially preferably a pneumatic vehicle tire for cars.

Preference is given to a tire as described above or as described above as preferred, wherein
the apparatus is mounted in the tread of the tire and
the central axis of the apparatus runs in the axial direction or in the circumferential direction of the tire.

One advantage of the above-described aspect of the present invention is that braking or acceleration forces in circumferential direction and lateral forces in axial direction can be measured while driving.

In the context of the present invention, the central axis of an apparatus according to the invention preferably runs through the geometric center of the third layer of the apparatus according to the invention and at right angles to the longitudinal extent of the third layer, wherein the longitudinal extent of the third layer is preferably exactly at the midpoint between the two longitudinal faces of the third layer of the apparatus according to the invention.

Preference is given to a tire as described above or as described above as preferred, comprising an apparatus, wherein the apparatus comprises a first, second, third, fourth and fifth layer, the third layer being optional,
characterized in that
a) the first layer comprises a first electrode material,
b) the second layer comprises a first intermediate material,
d) the fourth layer comprises a second intermediate material,
and
e) the fifth layer comprises a second electrode material, wherein
the first intermediate material of the second layer and the second intermediate material of the fourth layer are different,
the four or five layers are arranged one above the other according to the above sequence,
the surface of the second or fourth layer has a surface roughness $R_a$ in the range from 0.1 μm to 500 μm, measured in accordance with DIN EN ISO 4288:1998.
Preferably, the apparatus comprises and the apparatus comprises means for measuring the voltage between the first and fifth layers or the second and fourth layers of the apparatus.

Preference is given to a tire as described above or as described above as preferred, wherein the apparatus
is suitable for measuring a mechanical force,
and/or
is suitable for generating an electrical voltage and for electrically charging a battery and/or accumulator attached to a wheel comprising the tire or attached to the tire.

Preference is given to a tire as described above or as described above as preferred, wherein the surface of the second and/or fourth layer has a surface roughness $R_a$ in the range from 0.5 to 100 µm, preferably 1 to 50 µm, particularly preferably 1 to 5 µm, measured in accordance with DIN EN ISO 4288:1998.

Preference is given to a tire as described above or as described above as preferred, wherein the second and/or fourth layer have a layer thickness in the range from 10 to 1000 µm, preferably in the range from 30 to 300 µm, particularly preferably in the range from 70 to 160 µm or from 101 to 160 µm, very particularly preferably in the range from 110 to 130 µm.

Preference is given to a tire as described above or as described above as preferred, wherein
the first intermediate material of the second layer has a dielectric conductivity $\varepsilon_r$ of greater than 1.01 F·m$^{-1}$, preferably of greater than 1.1 F·m$^{-1}$.
and/or
the second intermediate material of the fourth layer has a dielectric conductivity $e_r$ of greater than 1.01 F·m$^{-1}$, preferably of greater than 1.1 F·m$^{-1}$.

Preference is given to a tire as described above or as described above as preferred, wherein the difference between the specific triboelectric affinity of the first intermediate material of the second layer and the specific triboelectric affinity of the second intermediate material of the fourth layer is at least 20 nC/J, measured at 20° C. and at 35% relative air humidity.

Preference is given to a tire as described above or as described above as preferred, wherein
the first intermediate material of the second layer comprises a solid material or consists primarily of a solid material selected from the group consisting of polyurethane, a mica, glass, quartz, silk, poly(organo)siloxanes, cellulose and mixtures thereof, and/or
the second intermediate material of the fourth layer comprises a solid material or consists primarily of a solid material selected from the group consisting of acetate silk, natural or synthetic rubber, polyester, polyethylene, polyethylene terephthalates, polypropylene, polystyrene, polychlorobutadiene, polyacrylonitrile, polyvinyl chloride, poly(organo)siloxanes, vulcanized rubber particles and their mixtures, wherein the natural or synthetic rubbers are preferably the rubbers NR, ENR, BR, SBR, SSBR, PDMS, ESBR and epichlorohydrin rubber.

Preference is given to a tire as described above or as described above as preferred, wherein
the first intermediate material of the second layer comprises a solid material or consists primarily of a solid material selected from the group consisting of polyurethane, a mica, glass, quartz, silk, poly(organo)siloxanes, cellulose and mixtures thereof, and/or
the second intermediate material of the fourth layer comprises a solid material or consists primarily of a solid material selected from the group consisting of acetate silk, natural or synthetic rubber, polyester, polyethylene, polyethylene terephthalates, polypropylene, polystyrene, polychlorobutadiene, polyacrylonitrile, polyvinyl chloride, vulcanized rubber particles and their mixtures, wherein the natural or synthetic rubbers are preferably the rubbers NR, ENR, BR, SBR, SSBR, PDMS, ESBR and epichlorohydrin rubber.

Preference is given to a tire as described above or as described above as preferred, wherein
the first intermediate material of the second layer comprises a solid material or consists primarily of a solid material selected from the group consisting of polyurethane, poly(organo)siloxanes, cellulose and mixtures thereof, and/or
the second intermediate material of the fourth layer comprises a solid material or consists primarily of a solid material selected from the group consisting of acetate silk, natural or synthetic rubber, polychlorobutadiene, polyacrylonitrile, polyvinyl chloride and mixtures thereof, wherein the natural or synthetic rubbers are preferably the rubbers NR, ENR, BR, SBR, SSBR, PDMS, ESBR and epichlorohydrin rubber.

Preference is given to a tire as described above or as described above as preferred, with the second and/or fourth layer comprising at least one filler in addition to the second intermediate material.

Preference is given to a tire as described above or as described above as preferred, wherein the at least one filler
of the second layer is carbon black and/or silica, and/or
of the fourth layer is carbon black and/or silica.

Preference is given to a tire as described above or as described above as preferred, wherein the at least one filler
in the second layer
and/or
in the fourth layer or
in an amount in the range from 0.1% by weight to 50% by weight, preferably in the range from 1% by weight to 20% by weight, particularly preferably in the range from 1% by weight to 10% by weight, very particularly preferably in the range from 3% by weight to 7% by weight, in each case as a proportion of the total mass of the first or fifth layer of the apparatus.

Preference is given to a tire as described above or as described above as preferred, wherein the second intermediate material of the fourth layer
comprises epichlorohydrin rubber or
consists primarily or entirely of epichlorohydrin rubber
and/or
the first intermediate material of the second layer
comprises poly(organo)siloxanes, preferably PDMS, or
consists primarily or entirely of poly(organo)siloxane, preferably PDMS.

Preference is given to a tire as described above or as described above as preferred, wherein the apparatus comprises a third layer between the second and fourth layer and the third layer comprises an insulation material.

Preference is given to a tire as described above or as described above as being preferred, wherein the third layer has an insulation material which at 20° C. has a specific electrical conductivity of less than 10$^{-1}$ S·cm$^{-1}$.

Preference is given to a tire as described above or as described above as preferred, wherein
the apparatus is mounted in the tread of the tire and/or
the central axis of the apparatus extends in the radial direction, in the axial direction or in the circumferential direction of the tire, preferably in the axial direction or in the circumferential direction of the tire, particularly preferably in the circumferential direction of the tire.

The above-described advantageous aspects of an apparatus according to the invention for measuring a mechanical force or of a tire or industrial rubber article according to the invention are also applicable to all aspects of one of the uses of an apparatus that are described hereinafter, and the advantageous aspects of one of the uses according to the invention of an apparatus that are discussed hereinafter are correspondingly applicable to all aspects of an apparatus according to the invention for measuring a mechanical force or of a tire or industrial rubber article according to the invention.

The invention also relates to a use of an apparatus as described above or as described above as preferred for measuring a mechanical force along the transverse extent of the third layer of the apparatus according to the invention or along the midpoint axis of the apparatus according to the invention.

The invention also relates to a use of an apparatus as described above or as described above as preferred for generating an electrical voltage between the first and fifth layers of the apparatus or between the second and fourth layers of the apparatus, the voltage preferably being used to charge an energy storage device, such as a battery or another accumulator on the wheel or tire. Thus, the force acting on the apparatus according to the invention is converted into charge stored in the energy storage device.

The invention also relates to a use of an apparatus as described above or as described above as preferred
- to generate an electrical voltage, preferably in the tire, and/or
- to measure a mechanical force along the circumferential direction or the axial direction in a tire.

Other advantageous aspects of the present invention are listed in the following as aspects, with the numbers in brackets referring to the reference signs in the attached figures:

1. Apparatus for measuring a mechanical force (12), comprising a first, second, third, fourth and fifth layer (1, 2, 3, 4, 5),
characterized in that
   a) the first layer (1) comprises a first electrode material,
   b) the second layer (2) comprises a first intermediate material having a dielectric conductivity $e_r$ of greater than 1.01 $F \cdot m^{-1}$,
   c) the third layer (3) comprises an insulation material (9),
   d) the fourth layer (4) comprises a second intermediate material having a dielectric conductivity $e_r$ of greater than 1.01 $F \cdot m^{-1}$,
   and
   e) the fifth layer (5) comprises a second electrode material,
   wherein
   the first intermediate material of the second layer (2) and the second intermediate material of the fourth layer (4) are different,
   the five layers are arranged one above the other,
   the second and fourth layers (2, 4) are separated from one another by means of the third layer (3) in a first state of the apparatus (6)
   and
   the third layer (3) is designed such that the second and fourth layers (2, 4) can come into contact with one another in a second state of the apparatus (6).

2. Apparatus according to aspect 1, wherein the insulation material (9) of the third layer (3) at 20° C. has an electrical conductivity of less than $10^{-1}$ $S \cdot cm^{-1}$.

3. The apparatus according to any of the preceding aspects, wherein
   the first intermediate material of the second layer (2) has a dielectric conductivity $\varepsilon_r$ of greater than 1.1 $F \cdot m^{-1}$
   and/or
   the second intermediate material of the fourth layer (4) has a dielectric conductivity $e_r$ of greater than 1.1 $F \cdot m^{-1}$.

4. Apparatus according to any of the preceding aspects, wherein the difference between the specific triboelectric affinity of the first intermediate material of the second layer (2) and the specific triboelectric affinity of the second intermediate material of the fourth layer (4) is at least 20 nC/J, measured at 20° C. and at 35% relative air humidity.

5. Apparatus according to any of the preceding aspects, wherein the third layer (3)
   consists of a mixture, wherein the mixture comprises a gas and particles consisting of the insulation material (9),
   or
   as insulation material (9) includes a liquid having a viscosity at 20° C. in the range from 0.1 mPa·s to $10^6$ mPa·s.

6. The apparatus according to any of the preceding aspects, wherein
   the first intermediate material of the second layer (2) comprises a solid material or consists primarily of a solid material selected from the group consisting of polyurethane, aluminum, polyamide, a mica, glass, polyacrylates, quartz, lead, silk, cellulose and mixtures thereof,
   and/or
   the second intermediate material of the fourth layer (4) comprises a solid material or consists primarily of a solid material selected from the group consisting of acetate silk, natural or synthetic rubber, polyester, polyethylene, polyethylene terephthalates, polypropylene, polystyrene, polychlorobutadiene, polyacrylonitrile, polyvinyl chloride, poly(organo)siloxane, Teflon, polyimides, vulcanized rubber particles, fillers and their mixtures, wherein the natural or synthetic rubbers are preferably the rubbers BR, SBR, SSBR, PDMS, ISBR and epichlorohydrin rubber.

7. Apparatus according to any of the preceding aspects, wherein apparatus (6) additionally comprises a stabilization shell (7) for increasing the mechanical stability of the apparatus (6) which encloses the entirety of the five layers (1, 2, 3, 4, 5).

8. A tire (24) or industrial rubber article comprising an apparatus (6) according to any of the preceding aspects and means (13) of measuring the voltage between the first and fifth layers (1, 5) of the apparatus (6).

9. Tire according to aspect 8, wherein
   the apparatus (6) is mounted in the tread (25) of the tire (24)
   and
   the central axis (19) of the apparatus (6) runs in the axial direction (14) or in the circumferential direction (15) of the tire (6).

10. Use of an apparatus according to any of the aspects 1 to 7 for measuring a mechanical force (12) along the transverse extent (18) of the third layer (3) of the apparatus (6).

11. Use of an apparatus according to any of the aspects 1 to 7 for generating an electrical voltage between the first and fifth layers (1, 5) of the apparatus (6).

DESCRIPTION OF FIGURES

FIG. 1 shows a schematic diagram of an apparatus 6 according to the invention, comprising five layers 1, 2, 3, 4, 5, a voltmeter 13 and a stabilization shell 7 in one embodiment. FIG. 1 shows a cross-sectional view of the apparatus 6 according to the invention, with the plane of intersection of the cross section running parallel to the central axis 19 of the apparatus 6. The central axis 19 of the apparatus 6 runs parallel to the transverse extent 18 of the various layers and through the geometric center 23 of the third layer 3 of an apparatus 6 according to the invention, and at right angles to the longitudinal extent 17 of the various layers (only the longitudinal extent 17 of the first layer 1 is shown in FIG. 1). FIG. 1 also shows the longitudinal faces 20 of the fourth layer 4 and the longitudinal faces 21 of the fifth layer 5 in schematic form in cross section. In addition, FIG. 1 shows, in schematic form, that the third layer 3, as described above, comprises a compressible compound 9 having a compression modulus and as an example of an insulation material. The apparatus 6 shown in FIG. 1 is in a first state, with no external mechanical force acting on the apparatus 6 according to the invention. In this first state, the third layer 3 separates the second layer 2 from the fourth layer 4. Since there is no contact between the second layer 2 and the fourth layer 4 in the first state of the apparatus 6 according to the invention, no electrons can be transferred between the second layer 2 and the fourth layer 4.

FIG. 2 shows a schematic diagram of an apparatus 6 according to the invention, comprising five layers 1, 2, 3, 4, 5, a voltmeter 13 and a stabilization shell 7 in a further embodiment. FIG. 2 shows a cross-sectional view of the apparatus 6 according to the invention, with the plane of intersection of the cross section running parallel to the central axis 19 of the apparatus 6. The central axis 19 of the apparatus 6 runs parallel to the transverse extent of the five layers 1, 2, 3, 4, 5 and at right angles to the longitudinal extent 17 of the five layers 1, 2, 3, 4, 5, and through the geometric center 23 of the third layer 3 of an apparatus 6 according to the invention. FIG. 2 shows, in schematic form, that the third layer 3 is compressed, since a mechanical force 12 is acting on the apparatus 6 according to the invention. The apparatus 6 shown in FIG. 2 is therefore in the second state, which follows on from the first state in the time sequence, with the mechanical force 12 acting on the apparatus 6 according to the invention from above and below in the example shown in FIG. 2. In this second state, the second layer 2 and the fourth layer 4 are in contact with one another. The contact between the second layer 2 and the fourth layer 4 in the second state of the apparatus 6 according to the invention enables transfer of electrons 11 from the second layer 2 to the fourth layer 4, and hence enrichment of the fourth layer 4 with additional negative charges 11 in the form of transferred electrons. This does not yet enable the development of an electrical voltage between the first and fifth layers, and this only occurs on removal of the second layer 2 and the fourth layer 4 from one another.

FIG. 3 shows a schematic diagram of an apparatus 6 according to the invention, comprising five layers 1, 2, 3, 4, 5, a voltmeter 13 and a stabilization shell 7 in a further embodiment. FIG. 3 shows a cross-sectional view of the apparatus 6 according to the invention, with the plane of intersection of the cross section running parallel to the central axis 23 of the apparatus 6. The central axis 23 of the apparatus 6 runs parallel to the transverse extent of the five layers 1, 2, 3, 4, 5 and at right angles to the longitudinal extent of the five layers 1, 2, 3, 4, 5, and through the geometric center 23 of the third layer 3 of an apparatus 6 according to the invention. FIG. 3 also shows, in schematic form, the longitudinal faces 22 of the third layer 3. In addition, FIG. 3 shows, in schematic form, in cross section, that the third layer 3 comprises a compressible compound 9 having a compression modulus as described above. The apparatus 6 shown in FIG. 3 is in a third state which differs from the first state of an apparatus 6 according to the invention merely in that the distribution of the electrons between the first, second, fourth and fifth layers 1, 2, 4, 5 is different compared to the first state.

Figure 1:
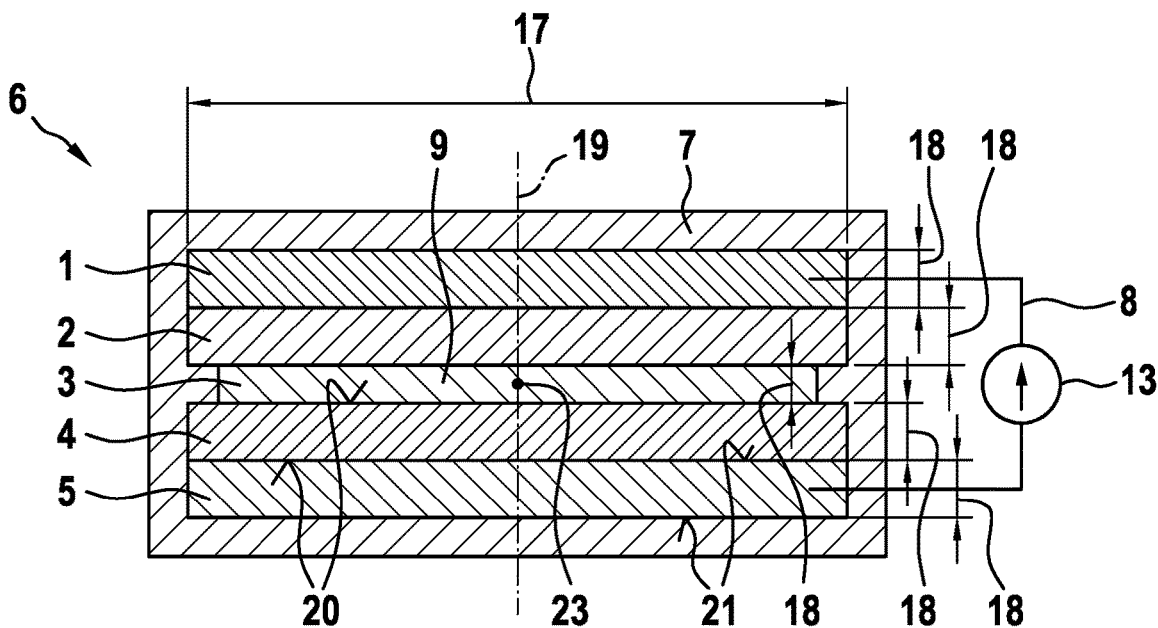
FIG. 1 Cross section through a schematic apparatus according to the invention in a first state before application of a mechanical force, with the plane of intersection of the cross section running parallel to the central axis of the apparatus.

In this third state, the third layer 3 separates the second layer 2 from the fourth layer 4, with the second layer 2 comprising fewer electrons, i.e. lacking negative charges 10, compared to the first state of the apparatus 6 according to the invention. The fourth layer 4 then additionally comprises the transferred electrons 11 compared to the first state of the apparatus 6 according to the invention. In order to compensate for this electrical charge differential, electrons can then flow from the fifth layer 5 into the first layer 1. The further the second layer 2 and the fourth layer 4 are removed from one another, the higher the voltage between the fifth layer 5 and the first layer 1. The distribution of charge between the fourth layer 4 and the second layer 2 remains the same in terms of magnitude.

Figure 2:
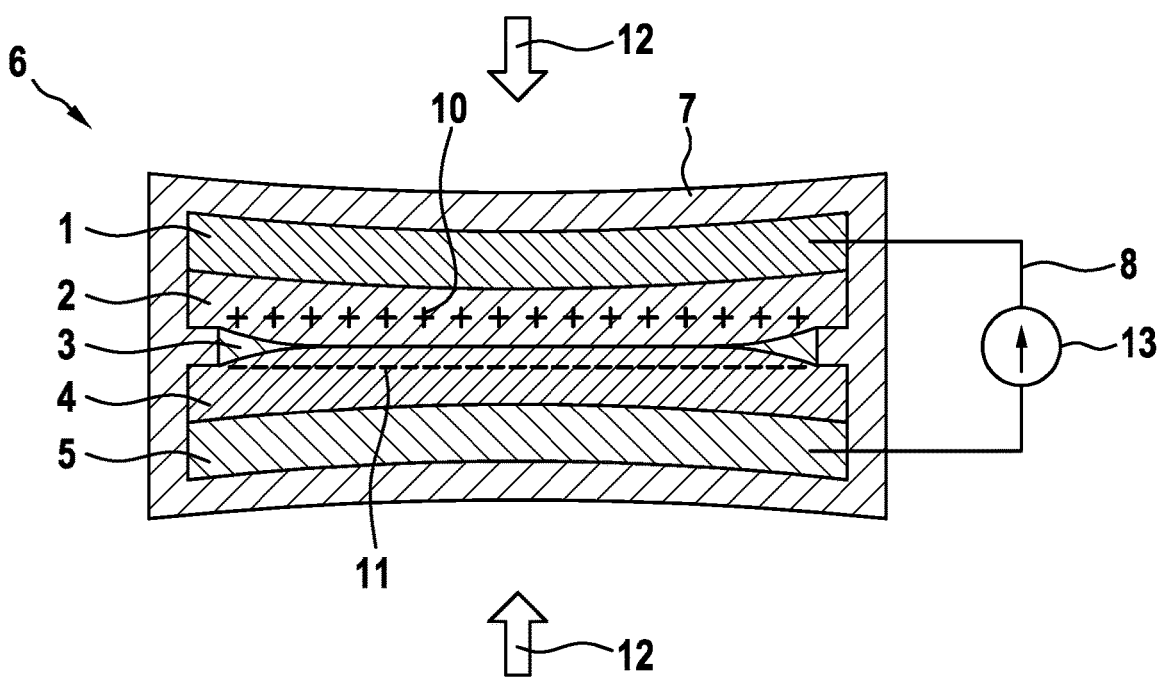
FIG. 2 Cross section through a schematic apparatus according to the invention in a second state during application of a mechanical force, with the plane of intersection of the cross section running parallel to the central axis of the apparatus.
Figure 3:
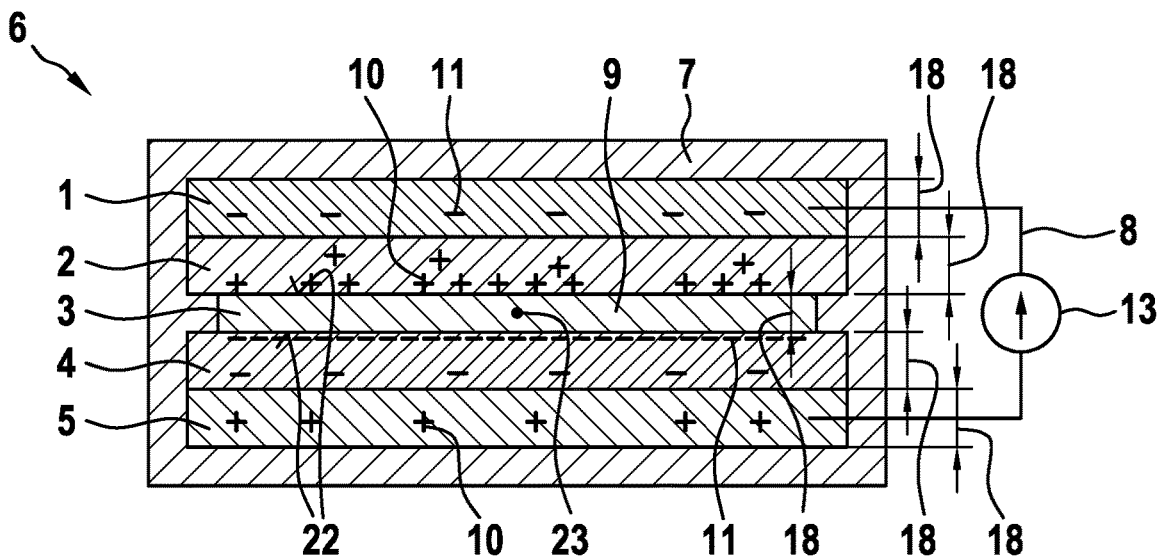
FIG. 3 Cross section through a schematic apparatus according to the invention in a third state after application of a mechanical force, with the plane of intersection of the cross section running parallel to the central axis of the apparatus.

This flow of the electrons is reversed as soon as the fourth layer 4 and the second layer 2 approach one another again until they touch, i.e. go back into the second state as shown in FIG. 2. The apparatus 6 according to the invention can thus then be converted from the second to the third state or from the third to the second state as often as desired by applying a mechanical force, and hence the electrons, as described above, can be shifted in an ever-alternating manner from the fifth layer 5 into the first layer 1 and vice versa.

Figure 4:
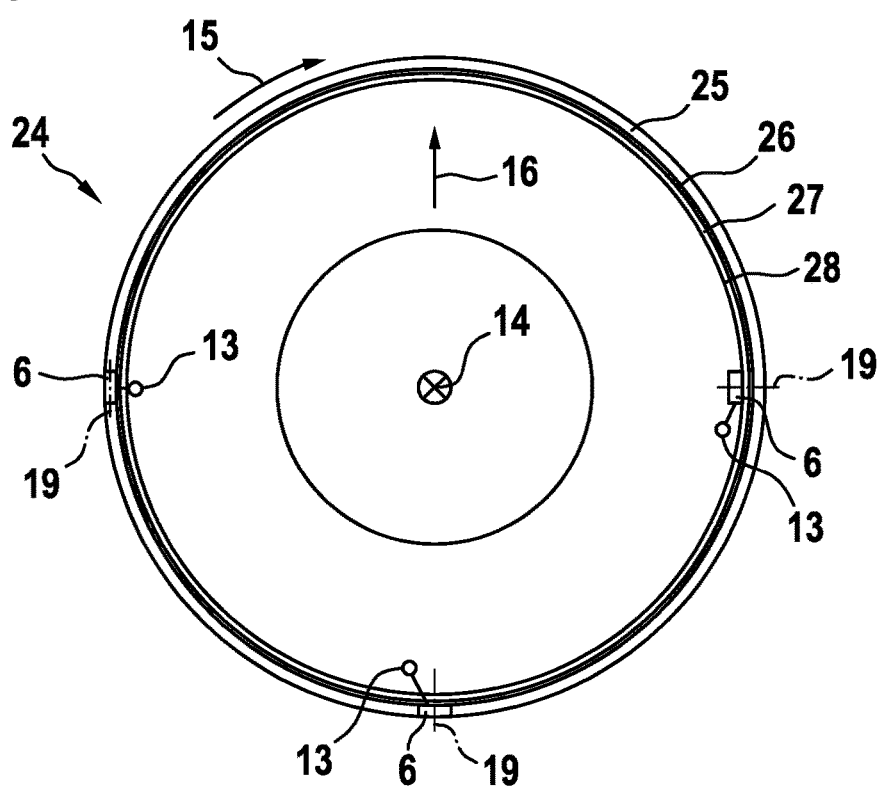
FIG. 4 Cross section through a schematic tire according to the invention, with the plane of intersection of the cross section running at right angles to the axial direction of the tire.

FIG. 4 shows a schematic diagram of a tire 24 according to the invention, comprising three apparatuses 6 according to the invention for measuring a mechanical force in a further embodiment in cross-sectional view, with the plane of intersection of the cross section running at right angles to the axis of rotation 14 of the tire 24. The three apparatuses 6 according to the invention are arranged in the tread 25 or on the inner liner 28 of the tire 24 according to the invention, with the central axis 19 of one apparatus 6 according to the invention running parallel to the circumferential direction 15 or parallel to the radial direction 16 of the tire 24 according to the invention. According to the direction in which the central axis 19 of an apparatus 6 according to the invention runs in the tread 25 of a tire 24 according to the invention, it is possible in a particularly efficient manner to measure those mechanical forces that run parallel to the central axis 19 of the apparatus 6 according to the invention. Thus, if the central axis 19 of the apparatus 6 according to the invention runs parallel to the circumferential direction 15, it is possible in an especially efficient manner to measure the braking and acceleration forces while driving with a tire 6 according to the invention. If the central axis 19 of the apparatus 6 according to the invention runs parallel to the axis of rotation 14, it is possible in an especially efficient manner to measure the lateral forces that arrive when cornering with a tire 6 according to the invention. If the central axis 19 of an apparatus 6 according to the invention runs parallel to the radial direction 16 of the tire 6 according to the invention in the tread 25, there are particularly strong mechanical forces acting on the apparatus 6 according to the invention whenever the apparatus 6 according to the invention is in the part of the tread 25 that constitutes what is called the footprint of the tire 6 according to the invention.

Figure 5:
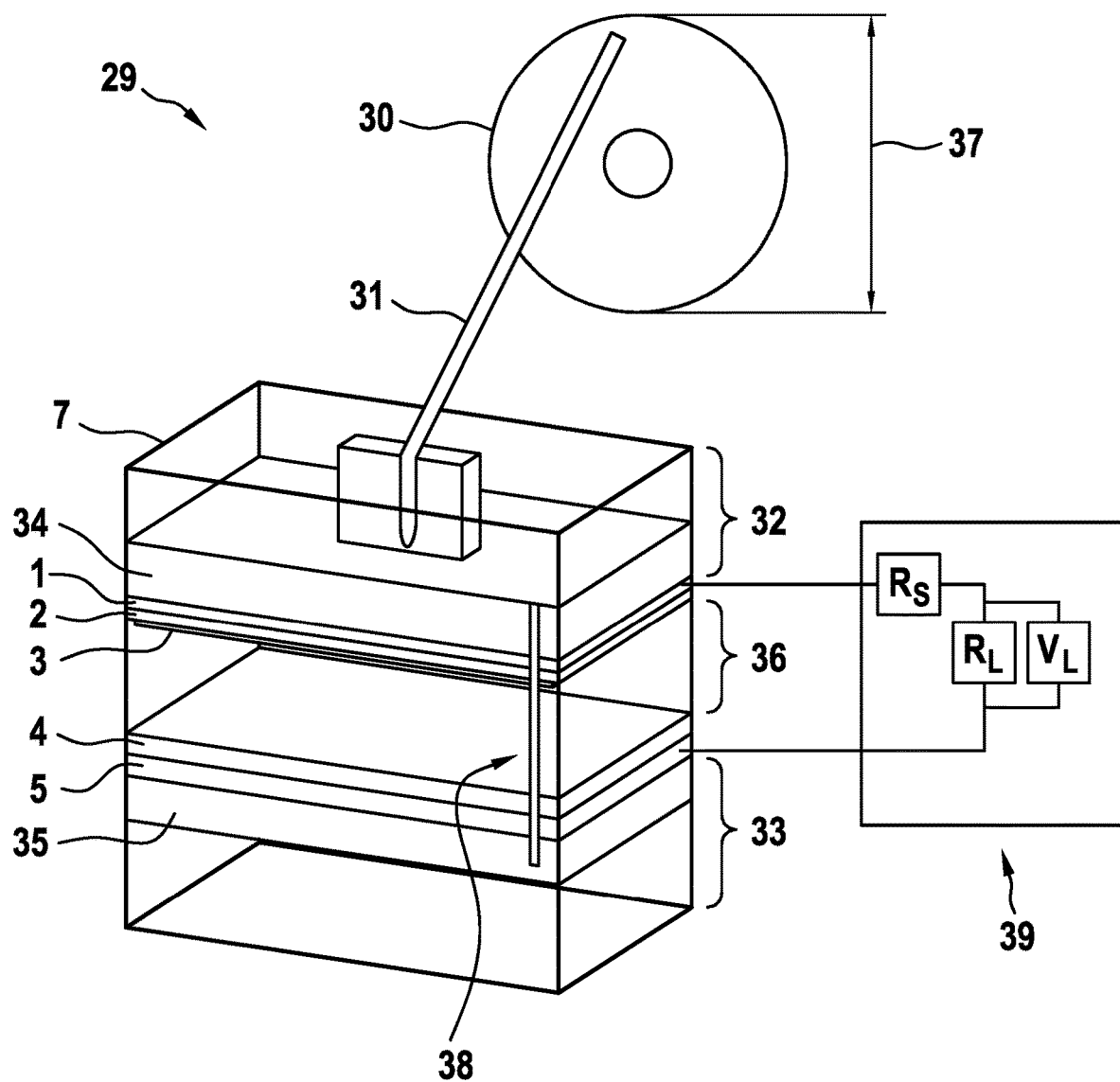
FIG. 5 a schematic representation of a measuring device for determining the electrical power of an apparatus according to the invention.

FIG. 5 shows a schematic representation of a measuring device 29 for determining the performance of an apparatus 1 according to the invention in a further embodiment, wherein the measuring device comprises an apparatus according to the invention 1, a flywheel 30 with a piston 31, and a stabilization shell 7 with a polycarbonate stamp 34 and a polycarbonate base 35. The stabilization shell 7 also comprises a polycarbonate border 38 with holes. The holes in the border 38 are used to allow a smooth escape and filling of the interior of the border 38 with air during the rotation of the flywheel 30. The rotation of the flywheel 30 causes the upper part 32 of the measuring device 29 to be moved up and down with the stamp 34 and the first and second layers 1, 2. Unless otherwise stated, the rotation took place at a frequency of 5 Hz, i.e. 5 revolutions per second. An oscilloscope 39 connected to the first and second electrode layer 1, 5, i.e. to the first and fifth layers 1, 5 of the apparatus 6 according to the invention, was used to determine the no-load voltage between the first and second electrode layer 1, 5 via the formula $V_0=V_L/(R_S+R_L)$ and the associated no-load current. The circuit of the oscilloscope 39 is shown schematically in FIG. 5 with the voltage source $V_L$ and the resistors $R_S$ and $R_L$, wherein the contacts to the indicated electrical circuit are connected to the first layer 1 and to the fifth layer 5 of the apparatus 1 according to the invention.

EXPERIMENTAL EXAMPLES

Test Methods
1. Surface Roughness $R_a$
The results were ascertained in accordance with the DIN EN ISO 4288:1998 method.
2. Electrical Measurement in Open-Circuit Conditions
The values for the open-circuit voltage and the no-load current were measured using the oscilloscope "Rigol Oscilloscope DS 4014" using the measuring device shown in FIG. 5 with a rotation frequency of the flywheel of 5 Hz. The diameter of the flywheel was 4 cm and the maximum distance between the second and fourth layers during rotation was 2.5 cm and the minimum distance was 0 cm. The oscilloscope had the following settings:
Attenuation ratio: 10: 1
Input resistance: 10 MΩ=2%
Input capacitance: 13 pF±3 pF
Maximum input CAT II 300 VAC
Compensation range: 6 pF-24 pF.
By the rotation of the flywheel, the second and fourth layers were periodically pressed against one another and removed from one another again. Thus, measurable voltages between the electrodes, i.e. between the first and fifth layers, are measured and from these corresponding current flows for the no-load or open circuit condition are determined, also called no-load current flows. These measurable no-load voltages and the resulting no-load current strengths were recorded by the oscilloscope in the form of periodic peaks, the period of the peaks corresponding to the frequency of rotation of the flywheel. The values recorded in Tables 2 to 4 for the open-circuit voltage and the open-circuit current level correspond in each case to the value of the difference between the maximum and the minimum of the measured peaks. Corresponding tests in which an apparatus according to the invention was used without a third layer as described above, i.e. in which the second and fourth layers were continuously touching one another and only the force acting on the second and fourth layers was changed, produced the same trends as the test results shown below.

Production:

TABLE 1

Compositions of the second and fourth layers used in the apparatus according to the invention:

| material | quantity | 2nd layer | 3rd layer | 4th layer |
| --- | --- | --- | --- | --- |
| GECO | phr | — | — | 100 |
| PDMS | phr | 100 | — | — |
| Filler | phr | — | — | see Table 2 |
| ZnO | phr | — | — | 3 |
| Stearic acid | phr | — | — | 2 |
| TMTD | phr | — | — | 2.5 |
| MBTS | phr | — | — | 1 |
| Dicumyl Peroxide | phr | 0.2 | — | — |
| Sulfur | phr | — | — | 1 |
| Air | % by wt. | — | 100 | — |

*GECO = terpolymer of epichlorohydrin, ethylene oxide and allyl-glycidyl ether;
** PDMS = polydimethylsiloxane The second layer of PDMS and the fourth layer of GECO are produced according to a standard prior-art production process, which included the steps of mixing, rolling and vulcanizing the respective rubber mixture according to Table 1 for the second and fourth layers. The mixing of the respective rubber mixture was carried out after adding the components into a Banbury mixer at 70° C. with a rotor speed of 60 rpm for 8 minutes. The rolling was carried out with a two-roll mill for 10 minutes, so that a layer thickness of 120 μm was obtained in the finished vulcanized layer (with the exception of the fourth layer in the E7 and E8 experiments in Table 4). The vulcanization was performed in a rectangular vulcanizing mold at the standard temperatures of 120° C. for 10 minutes. The layers produced in this way had a length of 100 mm and a height of 30 mm.

For the roughened surfaces of the fourth layers of examples E5 and E6, a mold segment of the vulcanizing mold which was roughened by sandblasting was used in their vulcanization. The sandblasting on the corresponding mold segment is carried out in such a way that surface roughnesses $R_a$ of 5 μm according to method DIN EN ISO 4288:1998 were achieved on the side facing the third layer.

Measurement Results:

Filler Content:

TABLE 2

Experimental data for the apparatus according to the invention with varying filler components:

| Property | Units | Exp. V0 | Exp. E1 | Exp. E2 | Exp. E3 | Exp. E4 |
|---|---|---|---|---|---|---|
| Materials used in the layers of an apparatus according to the invention | | | | | | |
| 1st layer | | Copper | Copper | Copper | Copper | Copper |
| 2nd layer | | PDMS | PDMS | PDMS | PDMS | PDMS |
| 3rd layer | | Air | Air | Air | Air | Air |
| 4th layer | | GECO | GECO | GECO | GECO | GECO |
| 5th layer | | Copper | Copper | Copper | Copper | Copper |
| Thickness/transverse extent of the 2nd and 4th layer | μm | 120 | 120 | 120 | 120 | 120 |
| Filler type in the 4th layer (GECO) | | — | Silica[1] | Silica[1] | Carbon black[2] | Carbon black[2] |
| Filler weight in the 4th layer as a percentage of the total weight of the fourth layer | phr | 0 | 10 | 40 | 5 | 15 |
| Results | | | | | | |
| No-load voltage measured from peak-to-peak | V | 125 | 185 | 63 | 153 | 97 |
| No-load current measured from peak-to-peak | μA | 11 | 24 | 9 | 18 | 20 |

[1]Ultrasil 7000GR, Surface area - 175 m$^2$/g
[2]Conductive Carbon Black (CCB), Printex XE2, Particle size, <30 nm, surface area 950 m$^2$/g Table 2 shows that optimal performances can be achieved with filler contents from 5 to 40 phr. This shows that proportions from 0.1% by weight to 50% by weight, as a proportion of the total mass of the second intermediate layer (i.e. the fourth layer) of an apparatus according to the invention, performs well. Particularly high performances were achieved in the range from 1% by weight to 10% by weight (cf. experiments E0 without filler, E1 with 10-phr silica and E3 with 5-phr carbon black).

Surface Roughness $R_a$:

TABLE 3

Experimental data for the apparatus according to the invention with varying surface roughnesses

| Property | Units | Exp. V0 | Exp. E1 | Exp. E5 | Exp. E3 | Exp. E6 |
|---|---|---|---|---|---|---|
| Materials used in the layers of an apparatus according to the invention | | | | | | |
| 1st layer | | Copper | Copper | Copper | Copper | Copper |
| 2nd layer | | PDMS | PDMS | PDMS | PDMS | PDMS |
| 3rd layer | | Air | Air | Air | Air | Air |
| 4th layer | | GECO | GECO | GECO | GECO | GECO |
| 5th layer | | Copper | Copper | Copper | Copper | Copper |
| Filler type in the 4th layer (GECO) | | — | Silica[1] | Silica[1] | Carbon black[2] | Carbon black[2] |
| Thickness/transverse extent of the 2nd and 4th layer | μm | 120 | 120 | 120 | 120 | 120 |
| Filler weight in the 4th layer as a percentage of the total weight of GECO | phr | 0 | 10 | 10 | 5 | 5 |
| Surface roughness $R_a$ of the 4th layer | μm | 0.3 | 0.3 | 3 | 0.3 | 3 |
| Results | | | | | | |
| No-load voltage measured from peak-to-peak | V | 125 | 185 | 181 | 153 | 237 |
| No-load current measured from peak-to-peak | μA | 11 | 24 | 35 | 18 | 38 |

[1]Ultrasil 7000GR, Surface area - 175 m$^2$/g
[2]Conductive Carbon Black (CCB), Printex XE2, Particle size, <30 nm, surface area 950 m$^2$/g Table 3 shows that optimal performances can be achieved with surface roughnesses $R_a$ in the range from 0.1 to 5 μm. This also applies to the surface roughnesses $R_a$ of the second layer and to the range from 5 μm to 100 μm, in particular as shown in Table 3 for the range from 0.3 to 3 μm.

Layer Thicknesses of the Fourth Layer

TABLE 4

Experimental data of the apparatus according to the invention with varying thickness of the second layer

| Property | Units | Exp. V0 | Exp. E7 | Exp. E8 |
|---|---|---|---|---|
| Materials used in the layers of the apparatus | | | | |
| 1st layer | | Copper | Copper | Copper |
| 2nd layer | | PDMS | PDMS | PDMS |
| 3rd layer | | Air | Air | Air |
| 4th layer | | GECO | GECO | GECO |
| 5th layer | | Copper | Copper | Copper |
| Filler type in the 4th layer | | — | — | — |
| Thickness/transverse extent of the 2nd layer | μm | 120 | 60 | 250 |
| Thickness/transverse extent of the 4th layer | μm | 120 | 120 | 120 |
| Surface roughness $R_a$ of the 4$^{th}$ layer | μm | 0.3 | 0.3 | 0.3 |
| Results | | | | |
| No-load voltage measured from peak-to-peak | V | 125 | 61 | 63 |
| No-load current measured from peak-to-peak | μA | 11 | 5 | 5 |

Table 4 shows that optimal performance can be achieved with layer thicknesses in the range from 60 to 250 μm, especially with a layer thickness of 120 μm. This also applies to the layer thickness of the fourth layer. The layer thickness corresponds to the transverse extent of a layer of an apparatus according to the invention.

LIST OF REFERENCE SIGNS 1 first layer
2 second layer
3 third layer
4 fourth layer
5 fifth layer
6 apparatus
7 stabilization shell
8 contacts between the electrode materials and the means of measuring the voltage
9 insulation material; compressible compound
10 lack of negative charges
11 additional negative charges; transmitted electrons
12 mechanical force
13 means of measuring the voltage between the first and fifth layers of the apparatus; voltmeter
14 axis of rotation; axial direction
15 circumferential direction
16 radial direction
17 longitudinal extent
18 transverse extent
19 central axis of the apparatus
20 longitudinal faces of the fourth layer
21 longitudinal faces of the fifth layer
22 longitudinal faces of the third layer
23 geometric center of the third layer
24 tire
25 tread
26 belt
27 carcass
28 inner liner
29 measuring device for determining the performance of an apparatus according to the invention
30 flywheel for upward and downward movement of the first layer (i.e. copper electrode) and second layer (i.e. first intermediate layer) of the apparatus according to the invention
31 piston for connecting the flywheel to the upper part of the measuring device
32 top part of the measuring device comprising the first and second layer of the apparatus according to the invention
33 bottom part of the measuring device comprising the fourth and fifth layer of the apparatus according to the invention
34 polycarbonate stamp
35 polycarbonate base for fastening the fourth and fifth layer of the apparatus according to the invention
36 distance between the surfaces of the first and second intermediate layer
37 diameter of the flywheel
38 polycarbonate border with holes for escape and filling the interior of the border with air
39 oscilloscope

The invention claimed is:

1. A tire comprising:
a tread;
an inner layer formed below the tread;
a sensor apparatus arranged in the tread and comprising:
a first layer, a second layer, a third layer, a fourth layer and a fifth layer;
a) the first layer comprises a first electrode material;
b) the second layer comprises a first intermediate material and is adjacent the first layer;
d) the fourth layer comprises a second intermediate material; and,
e) the fifth layer comprises a second electrode material and is adjacent the fourth layer, the second layer and the fourth layer are between the first layer and the fifth layer;
a surface of the second layer or the fourth layer has a surface roughness Ra in the range from 0.1 μm to 500 μm, measured in accordance with DIN EN ISO 4288: 1998;
the first intermediate material of the second layer and the second intermediate material of the fourth layer are different;
the first, second, third, fourth, and fifth layers and are arranged in order one on the other of the first layer, the second layer, the third layer, the fourth layer and the fifth layer, and wherein at least one of the second and the fourth layer further comprises at least one filler;
the first, second, fourth and fifth layers are configured to operate in periodically in a compressed state and an uncompressed state and generate a voltage between the first electrode material and the second electrode material based on the roughness Ra of the fourth layer and a thickness of the second layer.

2. The tire according to claim 1, the apparatus comprises a voltmeter configured to measure the voltage between the first electrode material and the second electrode material and a battery; the battery charged by the voltage.

3. The tire according to claim 1, wherein the surface of the second layer and/or the fourth layer has a surface roughness Ra in the range from 0.5 to 100 μm, measured in accordance with DIN EN ISO 4288:1998.

4. The tire according to claim 1, wherein the second and/or fourth layer have a layer thickness in the range from 10 μm to 1000 μm.

5. The tire according to claim 1, wherein the first intermediate material of the second layer has a dielectric conductivity of greater than 1.01 F·m−1 and/or the second intermediate material of the fourth layer has a dielectric conductivity er of greater than 1.01 F·m−1.

6. The tire according to claim 1, wherein a difference between specific triboelectric affinity of the first intermediate material of the second layer and specific triboelectric affinity of the second intermediate material of the fourth layer is at least 20 nC/J, measured at 20° C. and at 35% relative humidity.

7. The tire according to claim 1, wherein the first intermediate material of the second layer comprises a solid material selected from the group consisting of polyurethane, a mica, glass, quartz, silk, poly (organo) siloxane, cellulose and their mixtures, and/or the second intermediate material of the fourth layer comprises a solid material selected from the group consisting of acetate silk, natural or synthetic rubber, polyester, polyethylene, polyethylene terephthalate, polypropylene, polystyrene, polychlorobutadiene, polyacrilonitrile, polyvinyl chloride, poly (organo) siloxane, vulcanized rubber particles, fillers, and any combinations thereof.

8. The tire according to claim 1, wherein the second and/or the fourth layer comprises at least one filler in addition to the first intermediate material and/or the second intermediate material.

9. The tire according to claim 8, wherein the at least one filler is one or more of a carbon black and a silica.

10. The tire according to claim 8, wherein the at least one filler is incorporated in an amount in the range of 0.1% to 50% by weight in each case as a proportion of the total mass of the first and/or fifth layer of the apparatus.

11. The tire according to claim 1, wherein the second intermediate material of the fourth layer comprises epichlorohydrin rubber, and/or the first intermediate material of the second layer comprises poly (organo) siloxanes.

12. The tire according to claim 1, wherein the apparatus further comprises a third layer between the second layer and the fourth layer, and the third layer comprises an insulating material as a compressible compound.

13. The tire according to claim 12, wherein the insulating material has a specific electrical conductivity of less than 10−1 S·cm−1 at 20° C.

14. The tire according to claim 1, wherein the apparatus is mounted in a tread of the tire and/or a central axis of the apparatus extends in a radial direction, in an axial direction, or runs in a direction of rotation of the tire.

15. The tire according to claim 1, wherein the apparatus generates an electrical voltage and/or measures a mechanical force along the direction of rotation or the axial direction of the tire.

16. The tire of claim 1, the second layer and the fourth layer are in electrical contact and compressed during the compressed state.

17. The tire of claim 1, the sensor apparatus having a central axis parallel to a circumferential direction of the tire and the sensor apparatus configured to measure braking forces while driving.

* * * * *